(12) United States Patent
Semmler et al.

(10) Patent No.: US 7,793,633 B2
(45) Date of Patent: Sep. 14, 2010

(54) SWITCHING RESONANCE INTAKE SYSTEM FOR AN INTERNAL COMBUSTION ENGINE

(75) Inventors: Daniel Semmler, Stuttgart (DE); Wolfgang Zücker, Leonberg (DE); Georg Talan, Urbach (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 333 days.

(21) Appl. No.: 12/036,312

(22) Filed: Feb. 25, 2008

(65) Prior Publication Data
US 2008/0202462 A1    Aug. 28, 2008

(30) Foreign Application Priority Data
Feb. 23, 2007    (DE) .................... 10 2007 010 309

(51) Int. Cl.
*F02M 35/10*    (2006.01)
(52) U.S. Cl. ............. 123/184.57; 123/184.36; 123/184.53
(58) Field of Classification Search ............ 123/184.36, 123/184.53, 184.57
See application file for complete search history.

(56) References Cited

U.S. PATENT DOCUMENTS

| | | | | |
|---|---|---|---|---|
| 4,615,324 A | * | 10/1986 | Choushi et al. | 123/568.17 |
| 5,000,129 A | * | 3/1991 | Fukada et al. | 123/184.36 |
| 6,250,272 B1 | | 6/2001 | Rutschmann et al. | |
| 6,435,152 B1 | | 8/2002 | Leipelt et al. | |

FOREIGN PATENT DOCUMENTS

| | | |
|---|---|---|
| DE | 36 33 929 C2 | 4/1988 |
| DE | 39 40 486 A1 | 6/1991 |
| DE | 40 32 380 C2 | 4/1992 |
| DE | 198 42 724 | 3/2000 |
| DE | 103 21 323 B3 | 12/2004 |
| EP | 1 105 631 B1 | 6/2001 |
| JP | 03054318 A  * | 3/1991 |

* cited by examiner

*Primary Examiner*—Noah Kamen

(57) ABSTRACT

A switching resonance intake system is provided an internal combustion engine with a first and a second cylinder bank. The cylinder banks are each coordinated with a resonance container with a group of swing pipes leading to the cylinders, and the resonance containers are joined together by resonance pipes provided with switching valves. In the intake system, the swing pipes coordinated with the one cylinder bank are connected to the resonance container adjacent to the other cylinder bank. The intake system is intended for use in an internal combustion engine with cylinder banks having a V-layout.

17 Claims, 12 Drawing Sheets

SWITCHING RESONANCE INTAKE SYSTEM FOR AN INTERNAL COMBUSTION ENGINE

CROSS-REFERENCE TO RELATED APPLICATION

This application claims the priority, under 35 U.S.C. §119, of German application DE 10 2007 010 309.5, filed Feb. 23, 2007; the prior application is herewith incorporated by reference in its entirety.

BACKGROUND OF THE INVENTION

Field of the Invention

The invention concerns a switching resonance intake system, hereinafter, intake system, for short, for an internal combustion engine, with a first and a second cylinder bank. The cylinder banks are each coordinated with a resonance container with a group of swing pipes leading to the cylinders, and the resonance containers are joined together by resonance pipes provided with switching valves.

Intake systems with resonance charging for optimal filling of the cylinders under different engine speeds and load ranges are familiar in the prior art. Thus, German patent DE 103 21 323 B3 represents and describes an intake system of the kind mentioned-above, configured for a 6-cylinder flat engine. This intake system by virtue of the fact that it is intended for a flat engine is symmetrical in configuration. Between the two resonance containers connected to the swing pipes there are provided two resonance pipes, while each resonance pipe has a central switching valve. The air supply to the intake system occurs in such a way that an air supply line has two individual pipes leading to one of these resonance pipes, which pass upstream into a single common pipe segment, in which a throttle valve is disposed. This concept of an intake system has proven to work well in a flat engine and thanks to the cylinder arrangement that is specific to a flat engine it enables a compact configuration for the intake system. The switching resonance pipes are disposed between the two resonance chambers.

A similar intake system is known from published, German patent application DE 198 42 724 A1, corresponding to U.S. Pat. No. 6,250,272. Here, a throttle valve is coordinated with each individual pipe leading to the resonance pipe.

A switching resonance intake system for an internal combustion engine with two cylinder banks in a V-layout is known from published, German patent application DE 39 40 486 A1. Here, two curved groups of swing pipes are opposite each other. Within the curve, resonance chambers are arranged, into which annular, length-adjustable resonance channels emerge. For this, the resonance channels on the one hand are provided with rotary slide valves; thanks to the rotation, an opening provided in the slide valve is moved and thereby changes the length of the resonance channels in continuous fashion. All resonance channels are oriented in the same direction. The swing pipes assigned to the one cylinder bank are connected to those resonance chambers adjacent to this cylinder bank. The resonance chambers are located between the resonance pipes and the swing pipes. The two resonance chambers are connected to each other by a channel, in which a switching valve is arranged. In relation to the lengthwise orientation of the internal combustion engine and, thus, the intake system, the swing pipes are arranged, on the one hand, around the resonance channels and, on the other hand, parallel to each other and in planes perpendicular to the lengthwise axis of the internal combustion machine. Due to the annular arrangement of the resonance pipes in this intake system, one has a configuration with a large structural height.

European patent EP 1 105 631 B1, corresponding to U.S. Pat. No. 6,435,152, shows an intake system with swing pipe and resonance system, in which resonance and swing pipes are disposed alternatingly next to each other in a ring around a central inner space. The inner space accommodates a rotary slide valve formed of several chambers, with which one can vary the length of the pipes continuously. Two resonance chambers are formed in the slide valve, which can be connected by a gate. The resonance pipes can be altered not only in the length, but also in their cross section, by shutting off one of the resonance pipes.

German patent DE 40 32 380 C2 discloses an intake system for an internal combustion engine of the in-line kind, wherein the intake system has two resonance chambers, to each of which are connected resonance pipes of different length or different cross section. These resonance pipes can be switched in groups and in the same direction for the two resonance chambers. The resonance chambers can be connected to each other by a gate. The air supply comes via the resonance pipes to the resonance chambers and from there to the swing pipes.

BRIEF SUMMARY OF THE INVENTION

It is accordingly an object of the invention to provide a switching resonance intake system for an internal combustion engine that overcomes the above-mentioned disadvantages of the prior art devices of this general type, in which the switching resonance intake system is suitable for an internal combustion engine with cylinder banks in V-layout, and the intake system has a compact configuration.

With the foregoing and other objects in view there is provided, in accordance with the invention, a switching resonance intake system for an internal combustion engine having a first and a second cylinder bank. The switching resonance intake system contains resonance containers each being coordinated with the cylinder banks; a group of swing pipes leading to cylinders of the cylinder banks, the swing pipes associated with one of the cylinder banks being connected to the resonance container adjacent to the other one of the cylinder banks; resonance pipes joining together the resonance containers; and switching valves disposed in the resonance pipes.

The problem is solved for an intake system of the kind mentioned above in that the swing pipes coordinated with the one cylinder bank are connected to the resonance container adjacent to the other cylinder bank.

Accordingly, based on the configuration of the intake system according to the invention, the swing pipes connected to the one, first cylinder bank are connected to the resonance container which is disposed next to the other second cylinder bank and the swing pipes connected to the second cylinder bank are connected to the resonance container which is next to the first cylinder bank. This basic configuration of the intake system makes possible the most diverse modifications, and in all of them one can achieve a compact configuration for the intake system, thanks to the mentioned coordination of swing pipes and resonance containers.

Thus, according to a preferred embodiment of the invention, the swing pipes and/or the resonance pipes are disposed inside the resonance container. Thus, one has a nested arrangement for the parts bringing about the leading of air into the intake system. The volumes of the resonance containers enclose the swing pipes and/or the resonance pipes.

In particular, the swing pipes coordinated with the particular cylinder bank are passed through the resonance container that is next to the cylinder bank.

An especially compact configuration of the intake system can be achieved when the swing pipes of the intake system, starting from the cylinder banks, are curved in the direction of the top side of the intake system and/or the resonance pipes starting from the cylinder banks are curved in the direction of the bottom side of the intake system. In particular, the group of intake pipes of the intake system is curved in one direction and the group of resonance pipes of the intake system is curved in the opposite direction, in particular, the two groups are nested one in the other. Preferably, the resonance pipes are curved in a U-shape.

In view of the fundamental principle of the invention, it is considered especially advantageous to arrange the swing and resonance pipes at a slant to a plane running across the lengthwise axis of the internal combustion engine, i.e., transverse to the crankshaft axis of the internal combustion engine. Preferably, the swing pipes are disposed parallel to each other and the resonance pipes parallel to each other, while the orientation of the swing pipes and the resonance pipes differs from each other.

The switching valves associated with the resonance pipes are disposed in the end or the central regions of the resonance pipes. If they are disposed in the end regions, one gets an optimized charging, albeit with higher structural expense for the case when each resonance pipe is coordinated with a central switching valve. In the case when the switching valves are disposed in the end regions of the resonance pipes, each resonance pipe has two switching valves; when disposed in the central regions, there is one switching valve for each resonance pipe.

Preferably, the resonance pipes form a first and a second resonance stage, which can be switched independently of each other, wherein a first switchable resonance pipe forms the first resonance stage and two second switchable resonance pipes form the second resonance stage.

According to a special embodiment of the invention, the air supply of the intake system has two supply lines, which are connected directly to the resonance container. Thus, the air supply does not go to one of the resonance pipes, but directly to the two resonance containers. This produces an especially good charging outcome.

The air supply preferably has at least one throttle valve, wherein the two air supply lines are disposed between the throttle valve and the two resonance containers. It is quite conceivable to assign a throttle valve to each air supply line, which will then open in synchronization. The length of the particular supply line preferably corresponds to at least half the length of a resonance pipe.

In view of the concept of the invention, an especially compact intake system can be achieved by nesting the individual functional components of the intake system in each other. Structurally, this is accomplished, in particular, by a multipiece configuration of the housing components of the intake system. Thus, the intake system has a bottom shell, an insert placed in this, a middle shell, and a top shell. The bottom shell holds, in particular, the switching valves and the bottom shell has the flange connection to the cylinder head and reproduces a partial geometry of the resonance pipes and the swing pipes. The insert reproduces, in particular, a partial geometry of the resonance pipes. The middle shell has, in particular, a flange for the connection of the throttle valves, lower admission fittings for the swing pipes and a partition wall between the two resonance containers; moreover, the middle shell reproduces partial geometries of the resonance pipes and the swing pipes. The top shell, in particular, has admission fittings for the swing pipes and the resonance pipes and reproduces partial geometries of the resonance pipes and swing pipes.

Other features which are considered as characteristic for the invention are set forth in the appended claims.

Although the invention is illustrated and described herein as embodied in a switching resonance intake system for an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
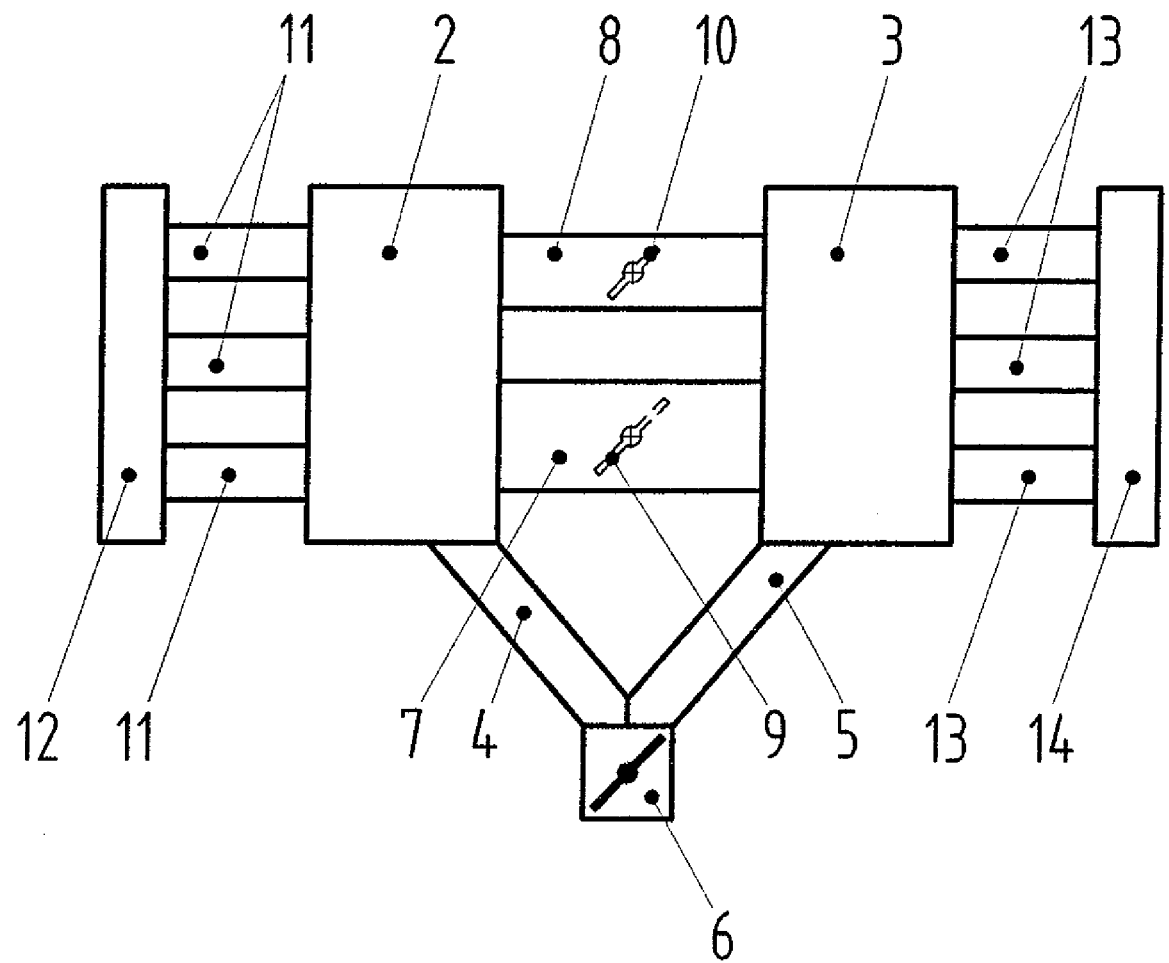
FIG. 1 is a schematic functional diagram of a switching resonance intake system according to the invention.

Referring now to the figures of the drawing in detail and first, particularly, to FIG. 1 thereof, there is shown a switching resonance intake system 1 for an internal combustion engine configured as a V6 engine with a resonance container 2 and a resonance container 3. The air supply of the intake system 1 has two supply lines 4 and 5, which are connected directly to the resonance containers 2 and 3. A throttle valve 6 governs the amount of air being supplied to the supply lines 4 and 5. Instead of the one throttle valve 6 shown, there can be two synchronously opening throttle valves, each throttle valve cooperating with one supply line 4 or 5.

The two resonance containers 2 and 3 are connected by two resonance pipes 7 and 8. The resonance pipe 7 has a central switching valve 9, the resonance pipe 8 has a central switching valve 10.

The resonance container 2 is assigned a group of three swing pipes 11, which are connected to one cylinder bank 12 of the internal combustion engine. The resonance container 3 is assigned a group of swing pipes 13, which are connected to the other cylinder bank 14 of the internal combustion engine. The peculiarity of the intake system of the invention is, and the functional representation is to be interpreted in this sense from the aspect of the structural configuration of the intake system, that the resonance container 2 disposed at the left side is connected via the swing pipes 11 to the cylinder bank 12 located on the right side in the structural configuration and the resonance container 3 disposed on the right is connected via the swing pipes 13 to the cylinder bank 14 arranged on the left in the structural configuration.

Figure 2:
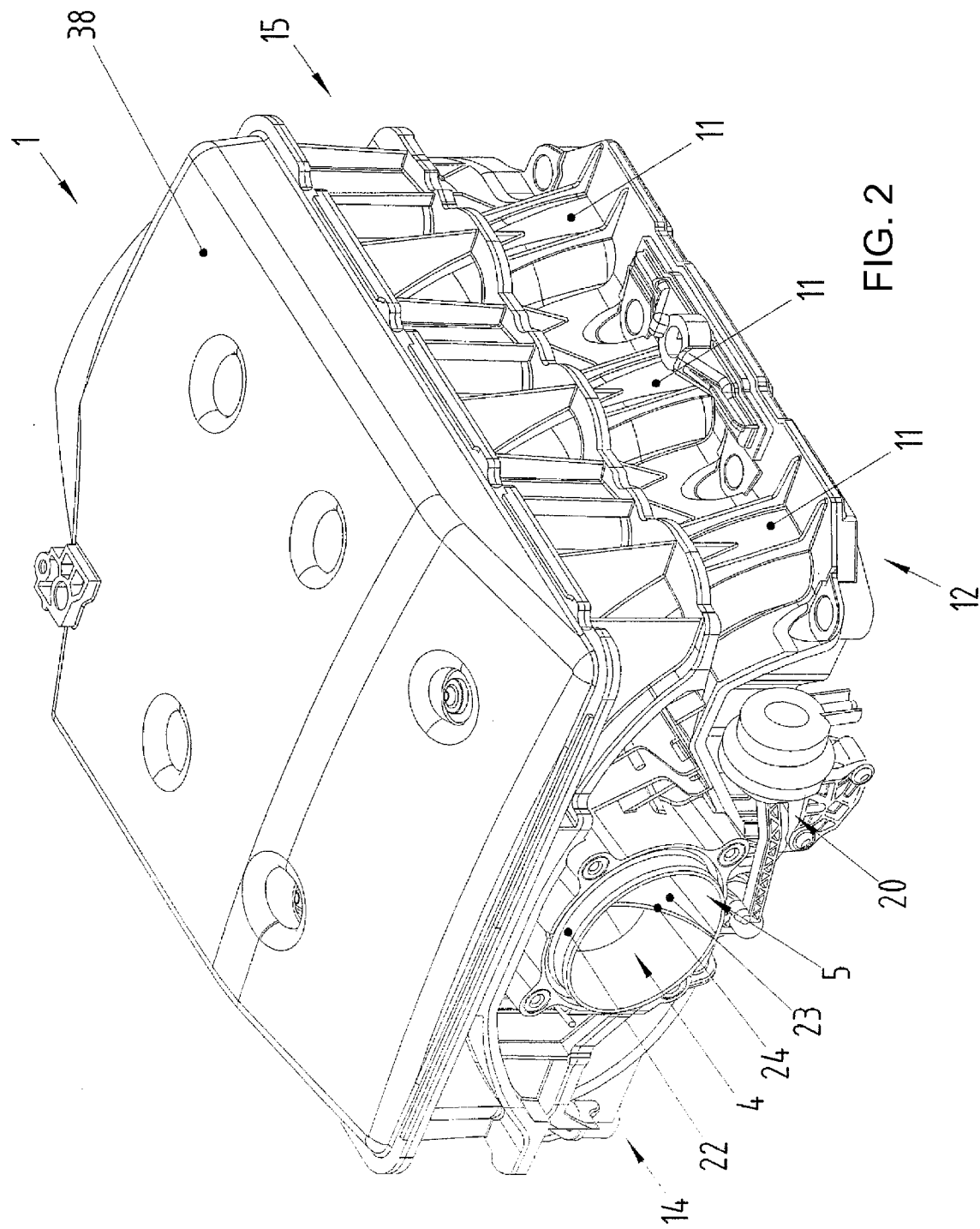
FIG. 2 is a diagrammatic, three-dimensional representation of the intake system, seen from above at a slant.
Figure 3:
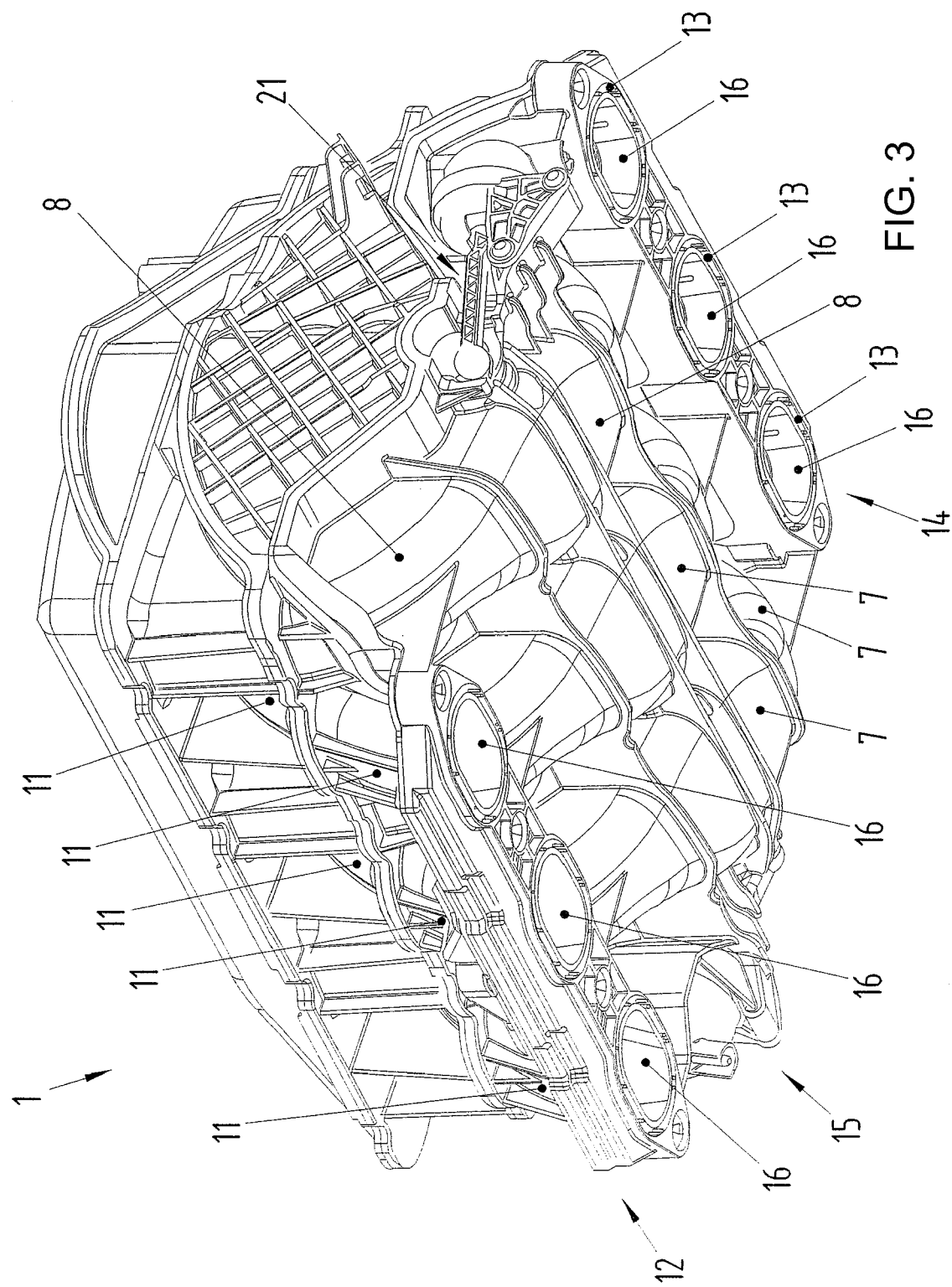
FIG. 3 is a diagrammatic, three-dimensional view of the intake system shown in FIG. 1, seen from below at a slant.

FIGS. 2 and 3 illustrate the intake system 1 operating by the functional principle of FIG. 1 in its structural configuration, namely, in three-dimensional views, shown at a slant from beneath and from above. One recognizes the multipiece makeup of the intake system 1, especially the multipiece makeup of the housing 15 of the intake system 1. The multipiece makeup is prominently shown by the representation of FIGS. 4 to 7.

FIGS. 1 to 7 shall now be described to explain the makeup of the intake system 1.

The intake system 1 is used in a V6 engine. Depicted in the region of the bottom side of the housing 15 are the discharge openings 16 of the six swing pipes 11, 13, while three swing pipes 11 form a first group and three swing pipes 13 form a second group. The reference number 12 indicates the cylinder bank coordinated with the swing pipes 11, the reference number 14 indicates the cylinder bank coordinated with the swing pipes 13. At the bottom side of the housing 15, three resonance pipes are formed. The one resonance pipe is designated by the reference number 8 in the sense of the diagram in FIG. 1, the other two resonance pipes are designated by 7 in the sense of FIG. 1. In the region of the vertical central axis of the intake system, which goes across the axis of the crankshaft of the internal combustion engine, the central switching valves 9 and 10 are coordinated with the resonance pipes 7 and the resonance pipe 8, respectively. The switching valves 9 and 10 can pivot on an axis 19, while the common adjustment of the switching valves 9 is done by a servo-drive 20 and the adjustment of the switching valve 10 by a servo-drive 21. In the position shown in FIG. 4, the switching valves 9 and 10 close the resonance pipes 7 and the resonance pipe 8, respectively. In a position preferably rotated about 90 degrees, they open up the passage of the resonance pipes 7 and 8.

For the air supply, the intake system 1 has a supply pipe connector 22, which is provided with a vertical partition wall 23 (FIG. 2), so that two separate airflows enter the housing 15, forming the supply lines 4 and 5 in this way. Near the partition wall 23 and upstream from it, a throttle valve (see FIG. 11) with circular cross section can pivot about a horizontal transverse axis of the supply pipe connector 22, which in its blocked position closes the passage of the supply pipe connector 22 and can move along a semicircular front contour 24 of the partition wall 23 in order to reach its fully open position. The drive unit for the throttle valve is also not depicted.

The following description pertains to the individual parts of the intake system 1 and the assembly of these parts to form the intake system 1.

Figure 4:
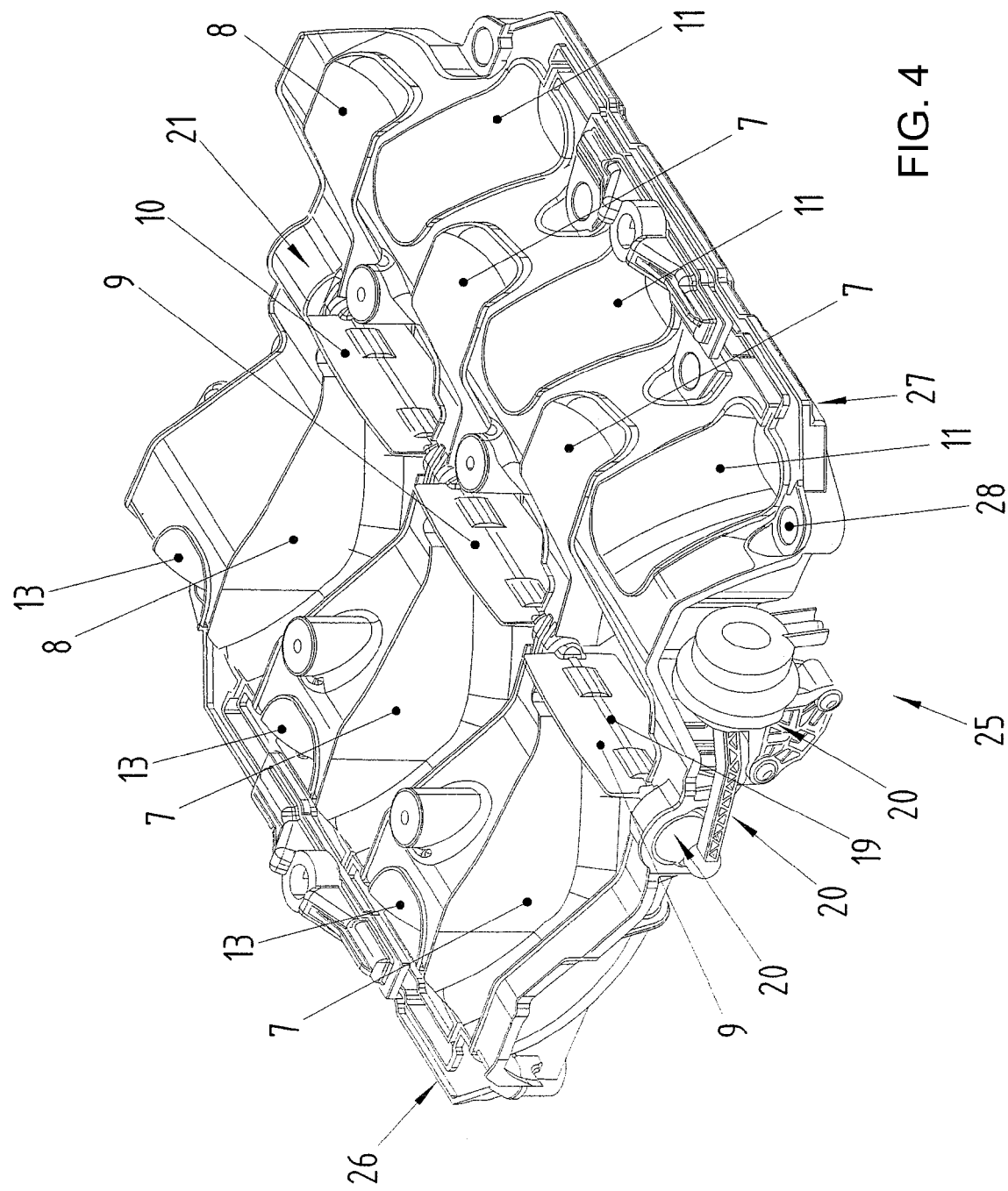
FIGS. 4 to 7 are diagrammatic, three-dimensional views showing the formation of the intake system from the individual components.

FIG. 4 illustrates a lower shell 25 of the intake system 1. This has the actuators for the two resonance stages, specifically, the drive unit 20 for the two switching valves 9 and the drive unit 21 for the switching valve 10. Moreover, the lower shell 25 has a flange connection 26 near the cylinder bank 14 and a flange connection 27 near the cylinder bank 12. Continuous holes for the fastening of the lower shell 25 to the cylinder head—eight holes are present—are indicated by reference number 28.

Finally, a partial geometry of the resonance pipes 7 and 8 is reproduced in the lower shell 25, and moreover a partial geometry of the swing pipes 11 and 13 is reproduced in the lower shell 25.

Figure 5:
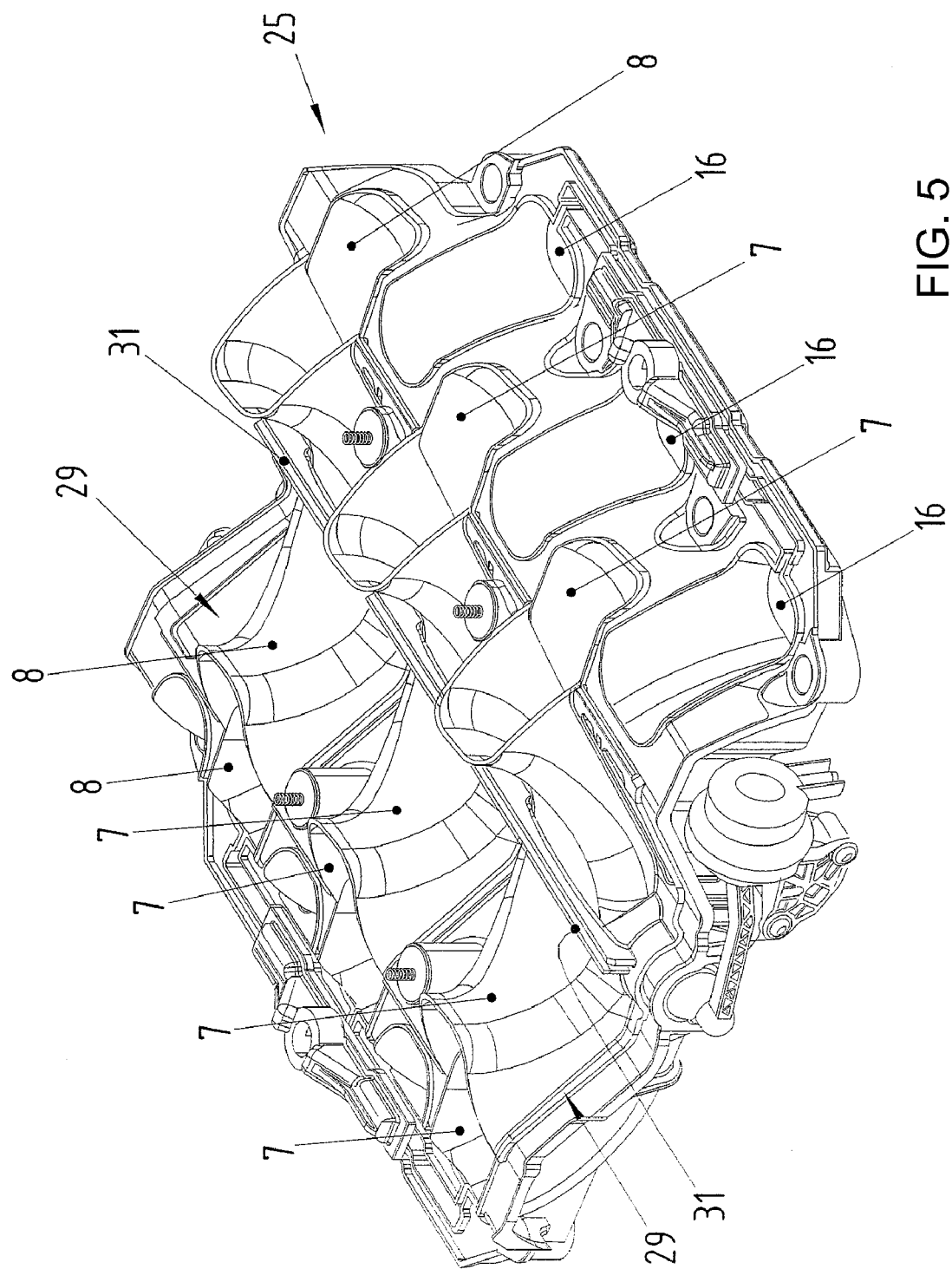
Figure 12:
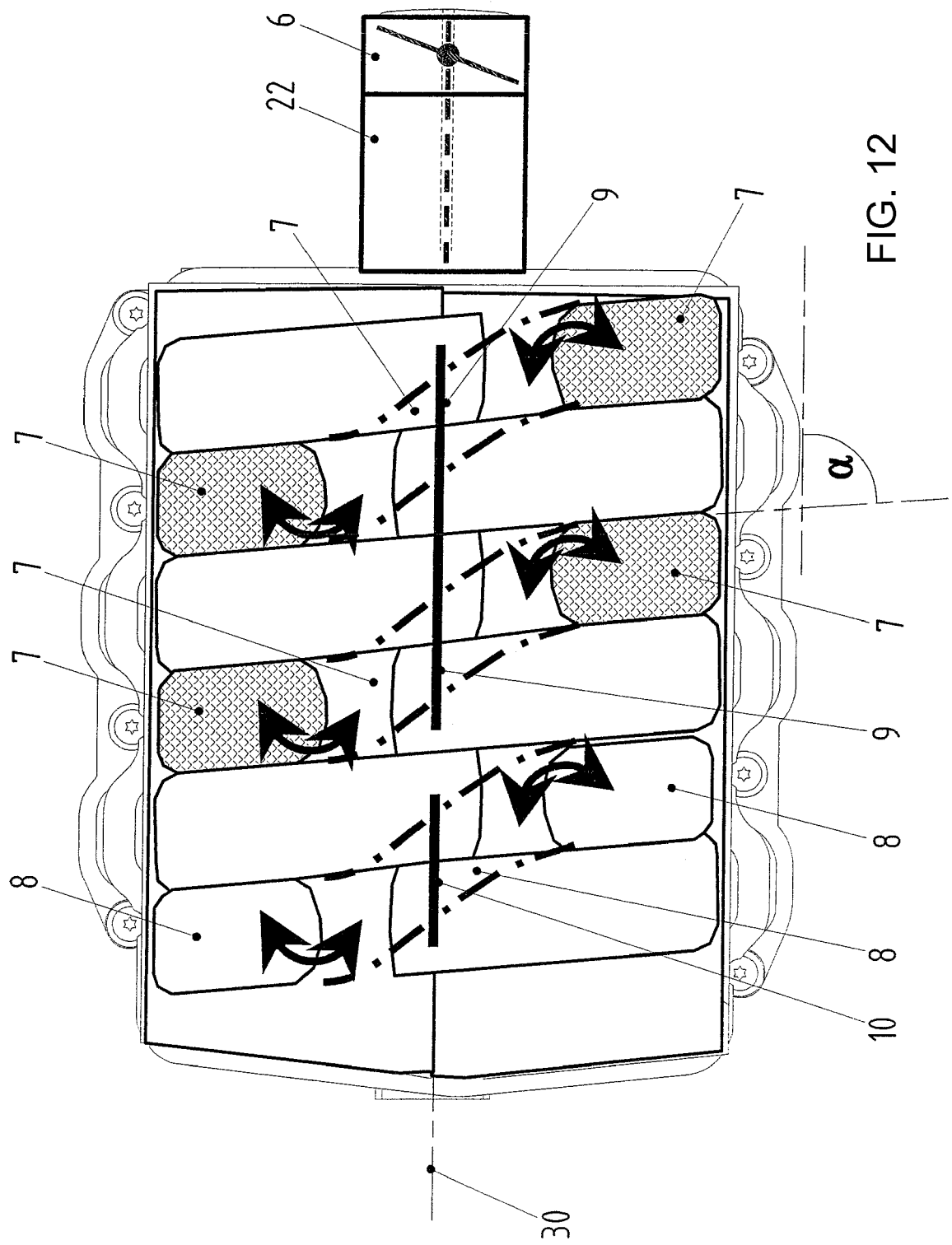

FIG. 5 shows a molded part inserted from above into the lower shell 25, being designated as insert 29. The insert 29 is an additional shell for production layout of the resonance pipes, i.e., the resonance pipe 8 and the two resonance pipes 7. From FIG. 5 one notices that resonance pipes 7 and 8 are created with a U-shaped bend, the apex of the U being directed downward. Moreover, from FIG. 5 one notices (and also refer to FIG. 12 in this regard) that the resonance pipes 7 and 8 as well as the swing pipes 11 and 13 are disposed at an angle α to a lengthwise center axis 30 of the intake system 1, and thus to the crankshaft axis of the V6 engine, which deviates from a right angle and is less than a right angle. FIG. 12 shows this angle with respect to a parallel line to the lengthwise center axis 30. Therefore the cylinders of the cylinder bank 12 of the engine are displaced slightly toward the cylinders of the cylinder bank 14 of the engine in the longitudinal direction. The bank offset results because two connecting rods are mounted in each journal in the crank mechanism of the engine.

FIG. 5, finally, shows a central groovelike seat 31 extending along the length of the insert 29, whose function shall be described in the next paragraph.

Figure 6:
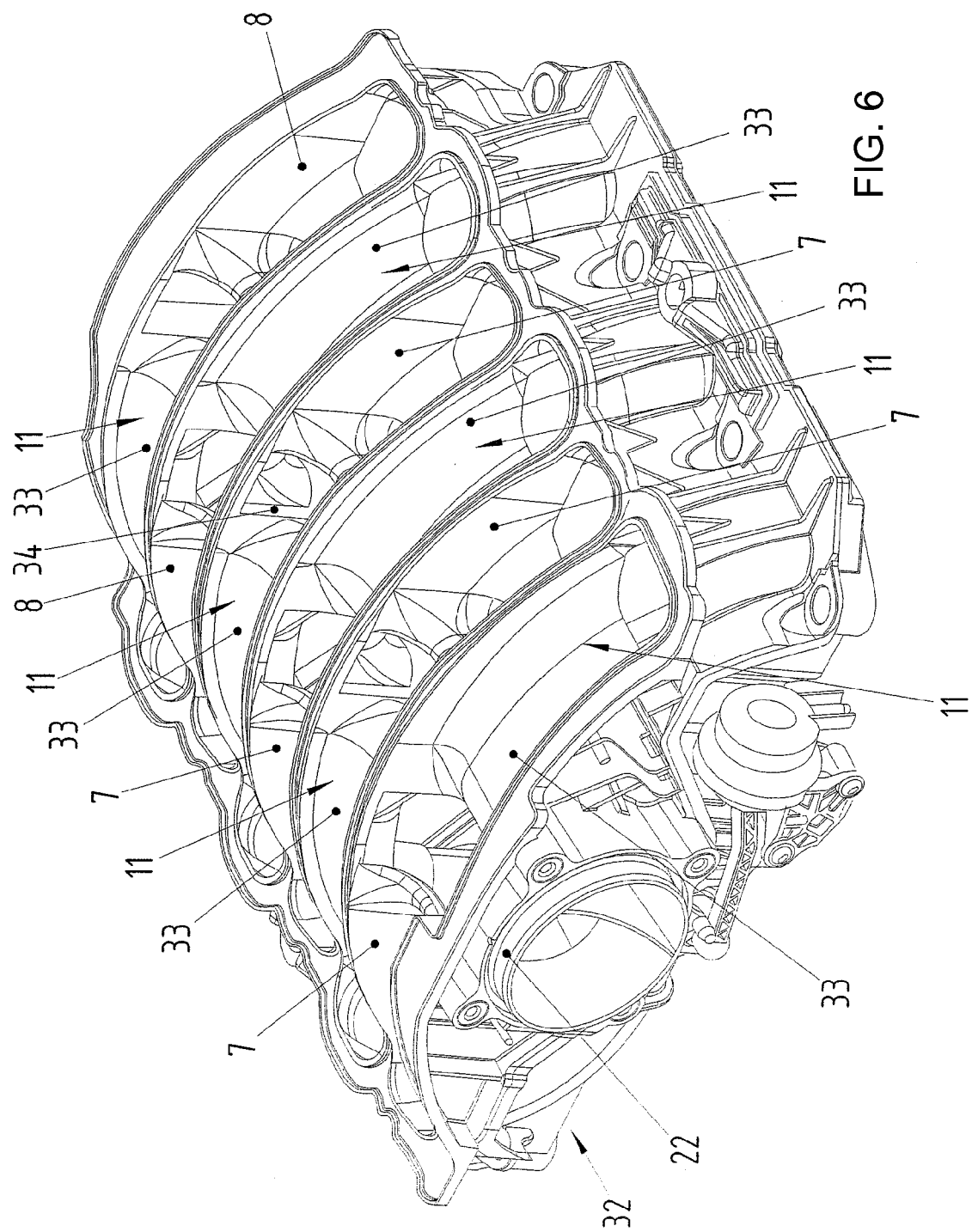

FIG. 6 illustrates a middle shell 32 connected to the lower shell 25 and insert 29 after they have been assembled. It contains the supply pipe connector 22, the lower admission fittings 33 of the swing pipes 11 and 13, as well as the partition wall 34 of the two resonance containers 2 and 3, while the partition wall 34 being continuous in the lower region engages with the seat 31 (see FIG. 8).

Figure 8:
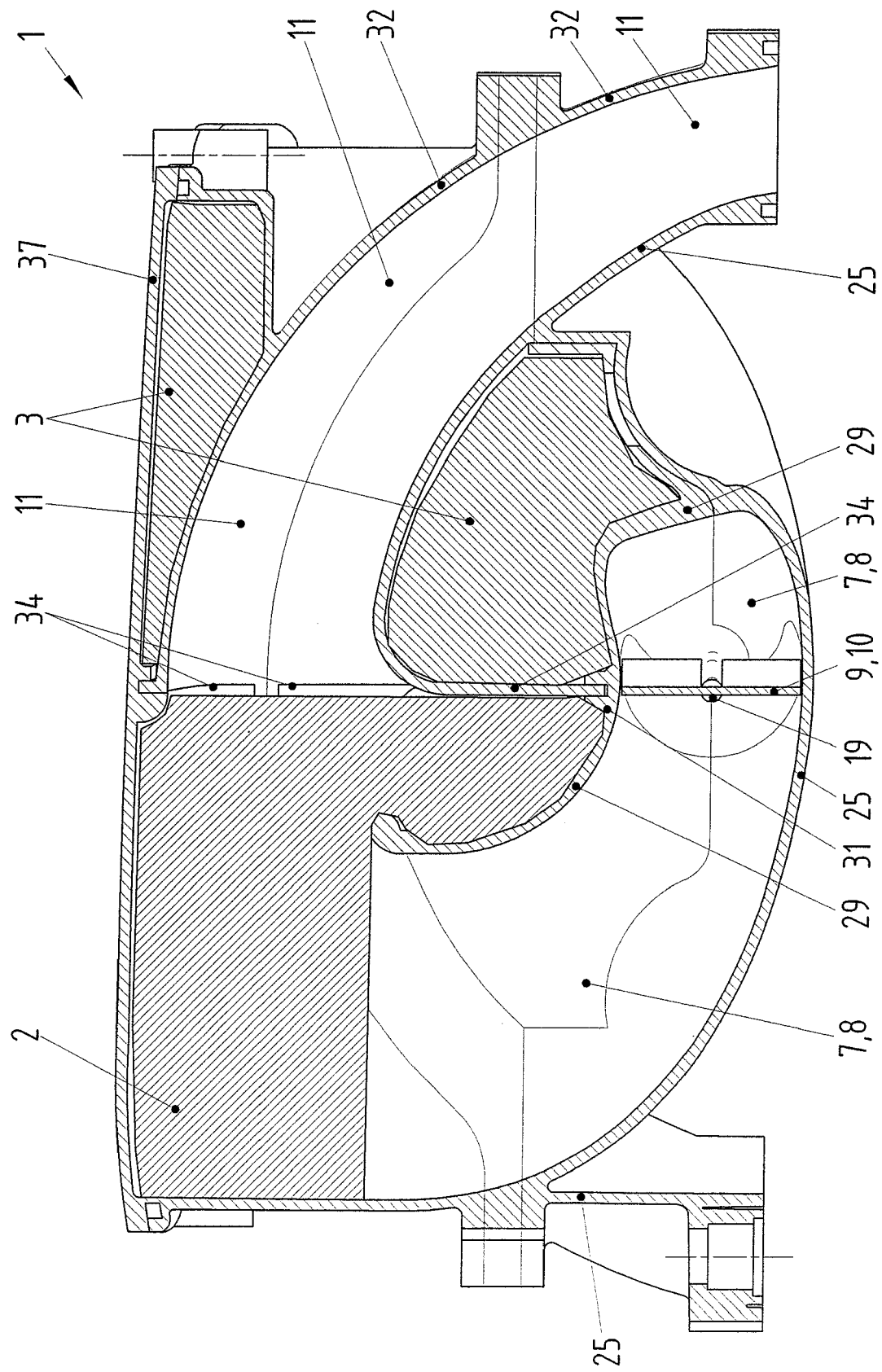
FIG. 8 is a diagrammatic, cross sectional view through the intake system, cut in the region of an intake connector.

Moreover, as is to be seen from the representation of FIG. 8, partial geometries of the resonance pipes 7 and 8 and of the swing pipes 11 and 13 are reproduced in the middle shell 32.

Figure 7:
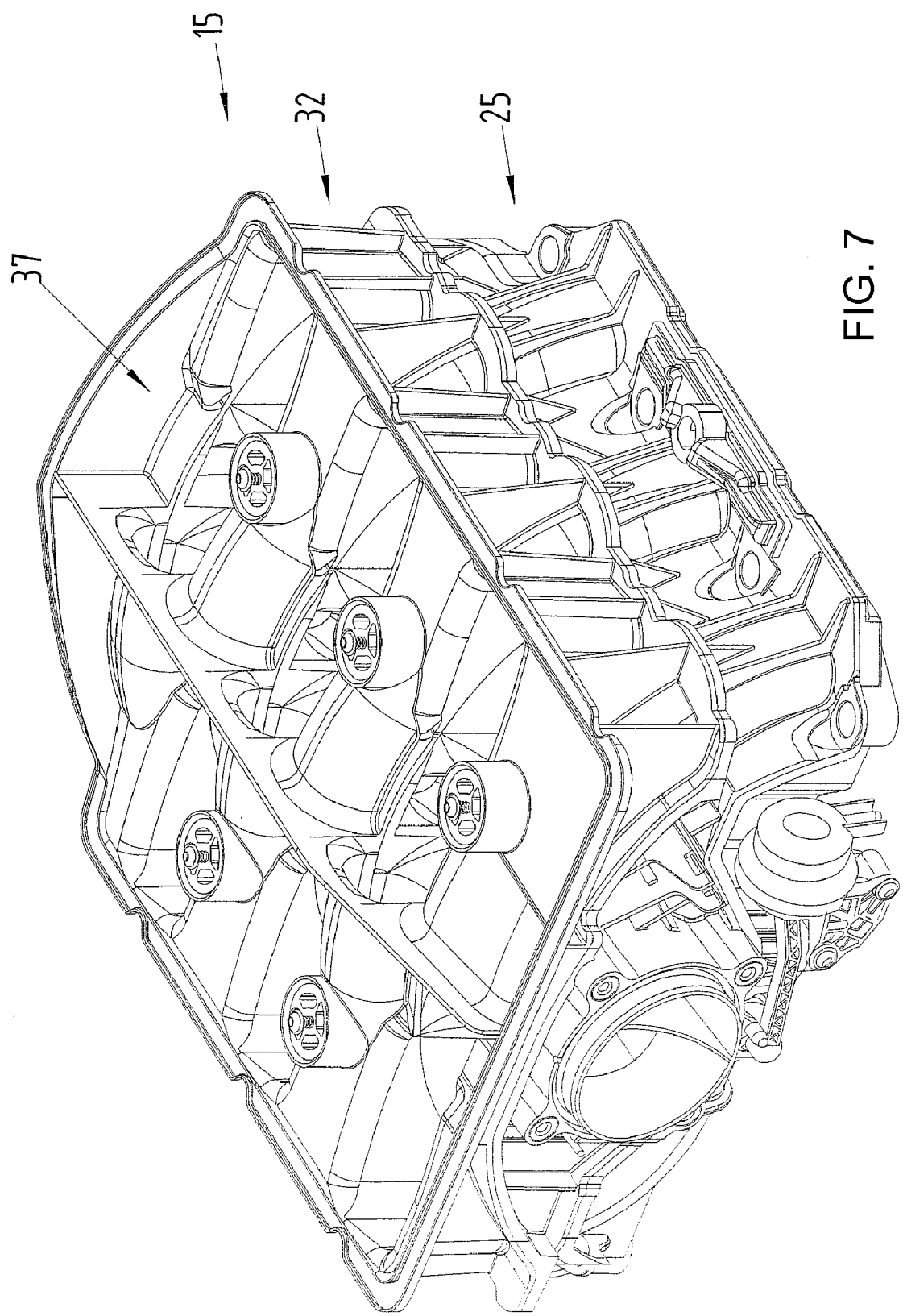

FIG. 7 shows the arrangement described thus far and an upper shell 37 placed thereon. The upper shell 37 reproduces the upper admission fittings for the swing pipes 11 and 13, the admission fittings for the resonance pipes 7 and 8, the partial geometry of the resonance pipes 7 and 8 and the swing pipes 11 and 13 (see FIG. 8). Only FIG. 2 shows that the upper shell 37 is closed with a cover 38. This is not significant to the functioning of the intake system 1.

Figure 9:
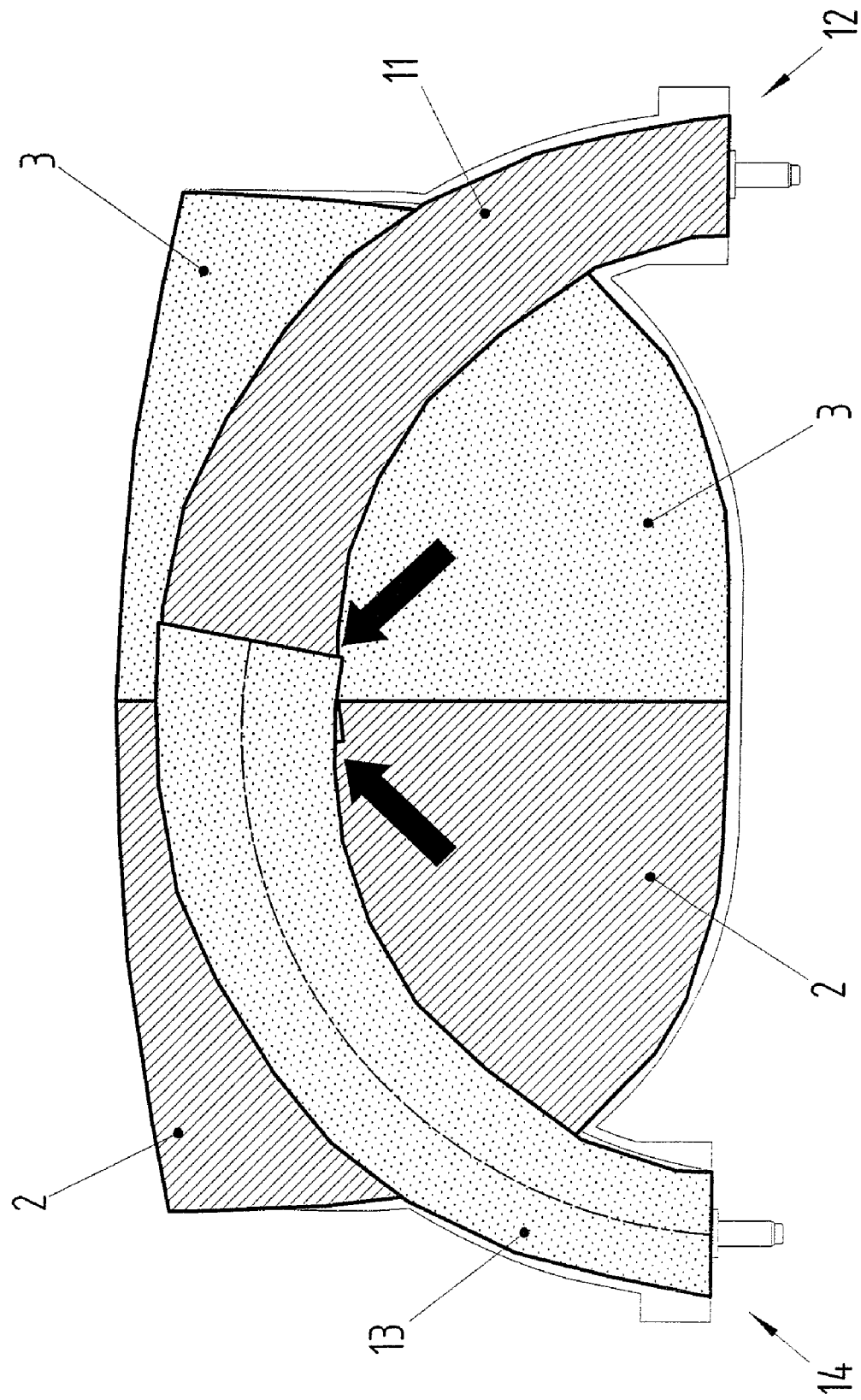
FIGS. 9 to 12 are schematic representations of the intake system to illustrate the functional principle of the intake system.

FIG. 8 shows a cross section through the intake system 1 of the invention to illustrate the basic layout. It shows that the partition wall 34 forms the two resonance containers 2 and 3, separated from each other. They basically occupy the space of the housing 15 that is not occupied by the swing pipes 11, 13 or the resonance pipes 7, 8. From the trend of the cross section in FIG. 8 one infers that the swing pipes and the resonance pipes are arranged inside the resonance containers 2 and 3. This is clear from the trend of the cross section shown in FIG. 8. It is shown there that the swing pipe 8 is led through the resonance container 2. If the trend of the cross section does not occur in the region of the swing pipe 11, but rather that of the swing pipe 13 on the other side of the intake system, one gets a cross sectional pattern corresponding to the mirror image of FIG. 8 with respect to the partition wall 34. The functional principle per FIG. 9 shows that the swing pipes 11 draw air from the resonance container 2 and the swing pipes 13 draw air from the resonance container 3. The respective swing pipes 11 and 13 taper toward the cylinder bank 12 and 14.

Figure 10:
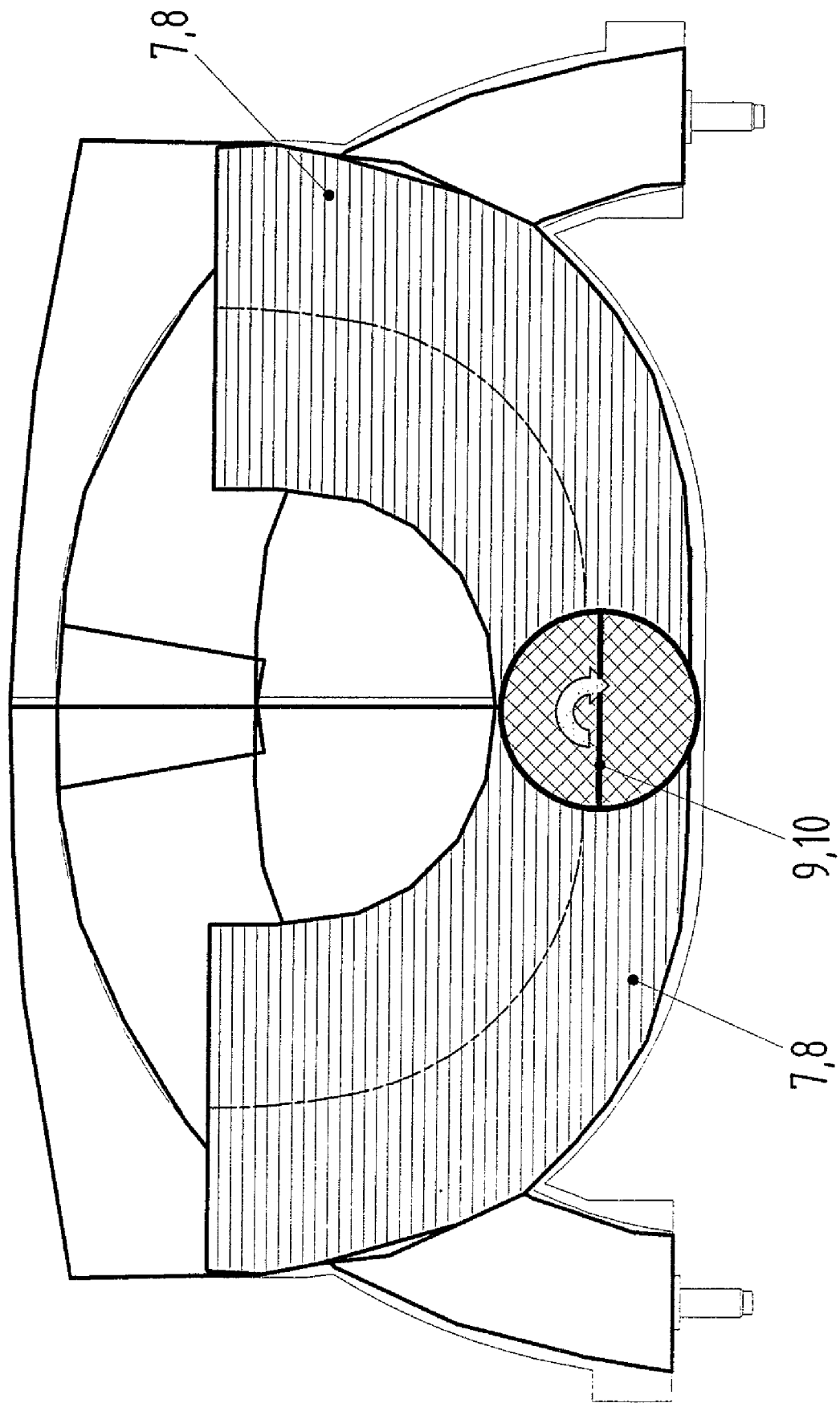

FIG. 10 shows a functional representation to illustrate the function of the resonance pipes 7, 8. The respective resonance pipe 7 or 8 is U-shaped, and the length of the respective resonance pipes is the same. The switching valve 10 serves to open the resonance stage 1, the switching valve 10 opens the resonance stage 2. The cross section of the resonance stage 1, i.e., that of the resonance pipe 8, is smaller than the cross section of the resonance stage 2, i.e., that of the combined cross section of the two resonance pipes 7.

Figure 11:
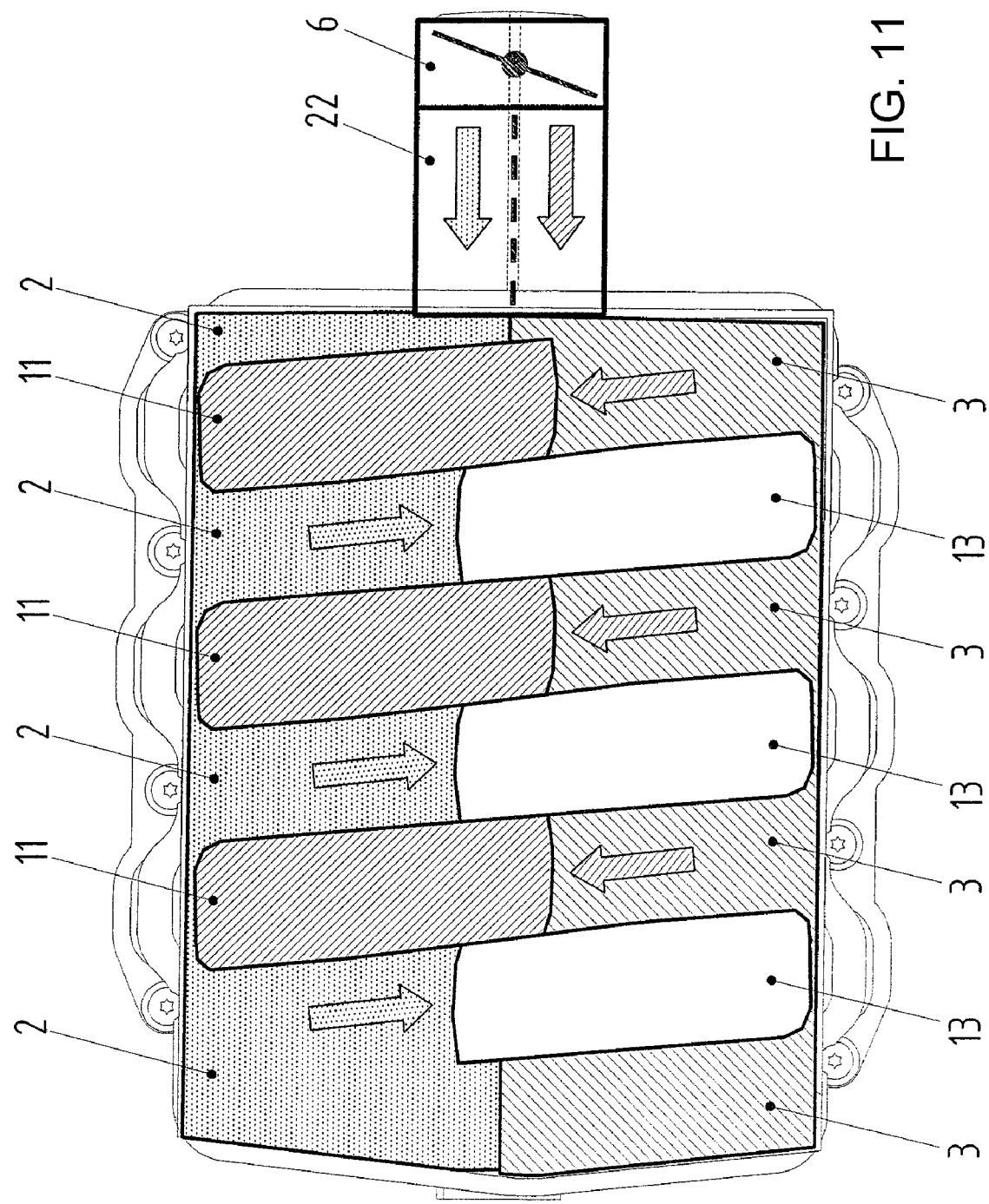

FIG. 11 shows the functional principle of the air intake of the swing pipes from the resonance containers. The swing pipes 11 draw air from the resonance container 3, the swing pipes 13 draw air from the resonance container 2.

FIG. 12 illustrates the functional principle of the intake module with regard to the resonance pipe 7, forming the resonance stage 1, and that of the two resonance pipes 8, forming the resonance stage 2. The diameter of the resonance pipe 7 corresponds to the diameter of the respective resonance pipe 8, so that the combined diameter of resonance stage 2 is greater than the diameter of resonance stage 1. The switching valve 9 serves to open the resonance stage 1, the two synchronously operated switching valves 10 serve to open the resonance stage 2. These switching valves 10 are shown in FIG. 12 as a continuous bar.

The resonance intake system functions as follows: in a lower rpm region, resonance stage 1 and resonance stage 2 is closed. In a middle rpm region, resonance stage 1 is open and resonance stage 2 is closed. In an intermediate range between the medium rpm range and the upper rpm range, the resonance stage 1 is closed and resonance stage 2 is open. In an upper rpm range, resonance stage 1 and resonance stage 2 is open.

Thus, the intake system of the invention makes sure that the natural frequency of the intake system is adapted for optimal filling of the cylinder in a V-engine over the entire rpm range.

The invention claimed is:

1. A switching resonance intake system for an internal combustion engine having a first and a second cylinder bank, the switching resonance intake system comprising:
   resonance containers each being coordinated with the cylinder banks;
   a group of swing pipes leading to cylinders of the cylinder banks, said swing pipes associated with one of the cylinder banks being connected to said resonance container adjacent to the other one of the cylinder banks;
   resonance pipes joining together said resonance containers, at least one of said swing pipes and said resonance pipes are disposed inside said resonance containers; and
   switching valves disposed in said resonance pipes.

2. The intake system according to claim 1, wherein said resonance pipes are curved in a U-shape.

3. The intake system according to claim 1, wherein:
   said swing pipes, starting from the cylinder banks, are curved in a direction of a top side of the intake system; and
   said resonance pipes starting from a region of the intake system near the cylinder banks are curved in a direction of a bottom side of the intake system.

4. The intake system according to claim 1, wherein said swing pipes form a group that is curved in one direction and said resonance pipes form a group that is curved opposite to said group of swing pipes.

5. The intake system according to claim 4, wherein said group of swing pipes and said group of resonance pipes are nested one in the other.

6. The intake system according to claim 1, wherein said swing pipes and said resonance pipes are disposed at a slant to a plane disposed transverse to a crankshaft axis of the internal combustion engine.

7. The intake system according to claim 1, wherein said switching valves are disposed in one of an end region and a central region of said resonance pipes.

8. The intake system according to claim 1, wherein said resonance pipes form a first and a second resonance stage, which can be switched independently of each other, said resonance pipes include a first switchable resonance pipe forming said first resonance stage and two second switchable resonance pipes forming said second resonance stage.

9. A switching resonance intake system for an internal combustion engine having a first and a second cylinder bank, the switching resonance intake system comprising:
   resonance containers each being coordinated with the cylinder banks;
   a group of swing pipes leading to cylinders of the cylinder banks, said swing pipes associated with one of the cylinder banks being connected to said resonance container adjacent to the other one of the cylinder banks, said swing pipes associated with a particular one of the cylinder banks are passed through said resonance container which is next to the one cylinder bank;
   resonance pipes joining together said resonance containers; and
   switching valves disposed in said resonance pipes.

10. A switching resonance intake system for an internal combustion engine having a first and a second cylinder bank, the switching resonance intake system comprising:
    resonance containers each being coordinated with the cylinder banks;
    a group of swing pipes leading to cylinders of the cylinder banks, said swing pipes associated with one of the cylinder banks being connected to said resonance container adjacent to the other one of the cylinder banks;
    resonance pipes joining together said resonance containers;
    switching valves disposed in said resonance pipes; and
    an air supply having two supply lines connected directly to said resonance containers.

11. The intake system according to claim 10, wherein said air supply has at least one throttle valve, and said two air supply lines are disposed between said throttle valve and said two resonance containers.

12. The intake system according to claim 10, wherein a length of said supply lines corresponds to at least half a length of a respective one of said resonance pipes.

13. The intake system according to claim 11, further comprising:
    a bottom shell;
    an insert placed in said bottom shell;
    a middle shell; and
    a top shell.

14. The intake system according to claim 13, wherein said bottom shell holds said switching valves and said bottom shell has a flange connection to a cylinder head and reproduces partial geometries of said resonance pipes and said swing pipes.

15. The intake system according to claim 13, wherein said insert reproduces a partial geometry of said resonance pipes.

16. The intake system according to claim 13, wherein said middle shell has a flange for connecting to said throttle valve, lower admission fittings for said swing pipes, and a partition wall between said two resonance containers, said middle shell further reproduces partial geometries of said resonance pipes and said swing pipes.

17. The intake system according to claim 13, wherein said top shell has admission fittings for said swing pipes and said resonance pipes and reproduces partial geometries of said resonance pipes and said swing pipes.

* * * * *